(12) United States Patent
Yang et al.

(10) Patent No.: US 11,808,915 B2
(45) Date of Patent: Nov. 7, 2023

(54) WIND POWER PREDICTION METHOD AND SYSTEM BASED ON DEEP DETERMINISTIC POLICY GRADIENT ALGORITHM

(71) Applicant: SHANDONG UNIVERSITY, Jinan (CN)

(72) Inventors: Ming Yang, Jinan (CN); Menglin Li, Jinan (CN); Yixiao Yu, Jinan (CN); Peng Li, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/119,450

(22) Filed: Mar. 9, 2023

(65) Prior Publication Data
US 2023/0288607 A1  Sep. 14, 2023

(30) Foreign Application Priority Data
Mar. 10, 2022 (CN) .......................... 202210229898.4

(51) Int. Cl.
*G01W 1/10* (2006.01)
*G05B 13/02* (2006.01)
(Continued)

(52) U.S. Cl.
CPC .............. *G01W 1/10* (2013.01); *G05B 13/026* (2013.01); *G06N 3/092* (2023.01); *G06N 3/047* (2023.01)

(58) Field of Classification Search
CPC .................................................. G05B 13/026
See application file for complete search history.

(56) References Cited

U.S. PATENT DOCUMENTS

2003/0041041 A1* 2/2003 Cristianini ............. G06N 20/00
706/12
2016/0350671 A1* 12/2016 Morris, II .......... G05B 23/0229
(Continued)

FOREIGN PATENT DOCUMENTS

CN      113794199 A  * 12/2021
KR        2143757 B1 *  8/2020

OTHER PUBLICATIONS

Markus Buchholz, "Deep Reinforcement Learning. Deep Deterministic Policy Gradient (DDPG) algorithm." Mar. 16, 2019, medium. com, accessed Jun. 2, 2023 at <markus-x-buchholz.medium.com/deep-reinforcement-learning-deep-deterministic-policy-gradient-ddpg-algoritm-5a823da91b43> (Year: 2019).*

(Continued)

*Primary Examiner* — James D. Rutten
(74) *Attorney, Agent, or Firm* — BROOKS KUSHMAN P.C.

(57) ABSTRACT

A wind power prediction method and system based on a deep deterministic policy gradient (DDPG) algorithm is provided and relates to the technical field of wind power prediction. The method uses multiple different prediction methods to build a combined prediction sub-model, and then uses a DDPG algorithm to maximize discount benefit by using an agent in the algorithm to interact with an external prediction environment for constant trial-and-error attempts. Finally, the agent has a capability of perceiving the external prediction environment, and a capability of reasonably and dynamically assigning weights to various prediction sub-models in a combined model, so as to achieve an accurate prediction.

7 Claims, 8 Drawing Sheets

(51) Int. Cl.
    *G06N 3/092* (2023.01)
    *G06N 3/047* (2023.01)

(56) References Cited

U.S. PATENT DOCUMENTS

| | | | | |
|---|---|---|---|---|
| 2018/0012137 | A1* | 1/2018 | Wright | G06N 7/01 |
| 2019/0004518 | A1* | 1/2019 | Zhou | G06N 7/01 |
| 2020/0049129 | A1* | 2/2020 | Girardot | F03D 7/0224 |
| 2020/0134680 | A1* | 4/2020 | Tamura | G06Q 30/0283 |
| 2020/0241542 | A1* | 7/2020 | Sung | G06N 3/088 |
| 2020/0342268 | A1* | 10/2020 | Chen | G06N 3/08 |
| 2021/0232922 | A1* | 7/2021 | Zhang | G06F 18/214 |
| 2022/0205425 | A1* | 6/2022 | You | G05B 19/0426 |

OTHER PUBLICATIONS

Chris Yoon, "Deep Deterministic Policy Gradients Explained", Mar. 20, 2019, Towards Data Science, accessed May 30, 2023 at <towardsdatascience.com/deep-deterministic-policy-gradients-explained-2d94655a9b7b> (Year: 2019).*

Sören Kirchner, "Deep Deterministic Policy Gradient (DDPG) with and without Ornstein-Uhlenbeck process", Sep. 29, 2021, medium.com, accessed May 30, 2023 at <soeren-kirchner.medium.com/deep-deterministic-policy-gradient-ddpg-with-and-without-ornstein-uhlenbeck-process-e6d272adfc3> (Year: 2021).*

First Office Action for Chinese Application No. 202210229898.4, dated May 5, 2022, 7 Pages (including English Translation).

Notification to Grant Patent Right for Invention for Chinese Application No. 202210229898.4, dated May 16, 2022, 3 Pages (including English Translation).

* cited by examiner

«WIND POWER PREDICTION METHOD AND SYSTEM BASED ON DEEP DETERMINISTIC POLICY GRADIENT ALGORITHM

CROSS-REFERENCE TO RELATED APPLICATION

This application claims foreign priority benefits under 35 U.S.C. § 119(a)-(d) to Chinese Patent Application No. 202210229898.4 filed on Mar. 10, 2022, which is hereby incorporated herein by reference in its entirety.

TECHNICAL FIELD

The present disclosure relates to the technical field of wind power prediction, and specifically, to a wind power prediction method and system based on a Deep Deterministic Policy Gradient (DDPG) algorithm.

BACKGROUND

The description in this section is merely intended to provide background information related to the present disclosure, and does not necessarily constitute the prior art.

In the background of global warming and energy crises, wind power generation has become one of indispensable energy forms with its clean and pollution-free characteristics, and installed capacity of the wind power generation in the world continues to increase. However, due to strong randomness and volatility of a wind speed in the nature, wind power changes dramatically from time to time, which brings great challenges to safe, economic and reliable operation of traditional power grids, and is also a major reason for hindering further development of the wind power generation. An accurate wind power prediction can reduce risks faced by dispatchers in setting a reserve capacity, arranging a unit combination, and making a market transaction decision. The wind power prediction method and system have become an essential module of a power system, which is of great significance to ensure safety and reliability of the power system and improve economic efficiency of the power system.

There are roughly three types of wind power prediction models, mainly including a physical model, a statistical model, and a combined model. Based on numerical weather prediction (NWP) data, the physical model takes into account roughness and terrain characteristics around a wind power plant, obtains a wind speed and a wind direction at a height of a wind turbine, and then converts the wind speed and the wind direction into a wind power prediction value by using a wind speed-power curve. However, prediction precision of the physical model depends on a complex meteorological principle and a detailed terrain of the wind power plant, which cannot be accurately obtained in actual predictions. The statistical model is applicable to a wind power plant with sufficient historical observation data, and includes a traditional persistence model, an auto regressive analysis model and its derivative model, a Gaussian process, a Markov model, and the like. In addition, artificial intelligence learning models that have developed rapidly in recent years, including a support vector machine (SVM), various neural network models, a deep learning model, a random forest model, and other tree learning models, are also statistical models essentially.

However, all kinds of prediction algorithms have limitations. A single prediction model cannot have optimal prediction performance in all scenarios. Based on this fact, a combined prediction model is proposed in order to integrate advantages of various sub-models, thereby improving precision of a wind power prediction. The building of the combined prediction model can be roughly constructed in two steps. In a first step, sub-models are selected. Reasonable selection of the sub-models helps to build a better combined model, which requires that each sub-model meets certain requirements in terms of "equal-likelihood" and dispersion. In a second step, the weights of the sub-models are optimized. Based on a historical power prediction dataset and a corresponding historical power measurement dataset, with the help of relevant optimization algorithms such as a particle swarm optimization (PSO) algorithm, a charged system search algorithm, and a robust optimization algorithm, a combination weight of various sub-models is assigned with a value, with a minimum error as an optimization goal.

A combination prediction has been proved to be an effective method for improving the precision of the wind power prediction. At present, weights set for various sub-models are mostly fixed. However, for the fixed weights, only overall performance of various sub-models are considered from an overall perspective of the dataset, without considering a local behavior that prediction performance of each sub-model changes with a change of an external prediction environment, which limits flexibility of the combination weights and loses the prediction precision partially. At present, existing variable weight combination predictions, such as adaptive exponential combination and a variance reciprocal method, quantitatively evaluate the prediction performance of each sub-model in a recent period only according to a timing change rule of the weight, and convert the prediction performance into a weight of each sub-model at a next prediction time point. In fact, the external prediction environment, including but not limited to fluctuation process of the wind speed, is also closely related to the prediction precision of each sub-model. The above existing variable weight combination model cannot effectively extract information about the external prediction environment, and is difficult to accurately determine a change trend of the prediction performance of each sub-model and reasonably change the weight.

SUMMARY

In order to resolve the above problems, the present disclosure provides a wind power prediction method and system based on a deep deterministic policy gradient (DDPG) algorithm. In the present disclosure, a plurality of different prediction methods are used to build a prediction sub-model for combined prediction, the DDPG algorithm is adopted, and the agent in the algorithm is used to interact with an external prediction environment to continuously try and make mistakes to maximize a discount income. Finally, the agent has a capability of perceiving the external prediction environment, and a capability of reasonably and dynamically assigning weights to various prediction sub-models in the combined model, so as to achieve accurate predictions.

According to some embodiments, the present disclosure adopts following technical solutions.

A wind power prediction method based on a DDPG algorithm includes:

obtaining data related to wind power prediction;

inputting the obtained data to each of a plurality of different trained prediction sub-models, to obtain corresponding wind power prediction value of each prediction sub-model;

building a combined model, where the combined model is a combination of various prediction sub-models, and each prediction sub-model is assigned with a respective weight;

perceiving a current state from a prediction environment at a to-be-predicted time point by using the DDPG algorithm, determining a policy based on the current state, obtaining a weight with exploration noise, assigning the weight to the combined model, and iteratively optimizing the policy based on a feedback reward until the DDPG algorithm converges; and determining a final weight based on the converged current policy, and assigning the final weight to the combined model to obtain a final wind power prediction value.

As an optional implementation, the data related to the wind power prediction includes a historical wind power sequence, as well as wind speed prediction data and wind direction prediction data at the to-be-predicted time point.

As an optional implementation, each prediction sub-model is comprehensively selected based on its Talagrand distribution and dispersion, and when a prediction model has a larger dispersion and a more average Talagrand distribution which means a larger standard deviation of a predicted value, the prediction model is more suitable as the prediction sub-model.

As an optional implementation, the prediction sub-model includes a support vector regression (SVR) model, an artificial neural network (ANN) model, and an extreme gradient boosting tree (XGBoost) model.

As an optional implementation, the DDPG algorithm includes two components: an environment and an agent; the environment is a combination mechanism of various prediction sub-models in an external prediction environment; and the agent is configured to perceive a state from an external environment, determine and output a weight of each prediction sub-model to the environment, and obtain a corresponding reward from the environment.

As an optional implementation, the DDPG algorithm includes three basic elements: a state, an action, and a reward, where the state is an indicator reflecting external environment information, including fluctuation information of meteorological prediction and prediction performance information of the prediction sub-models at a plurality of latest time;

the action is a determined weight; and the reward includes a fixed reward given based on a ranking, and an additional reward set based on a ratio of an absolute prediction error of the combined model to an absolute prediction error of an optimal prediction sub-model when the combined model ranks first.

As an optional implementation, the iteratively optimizing the policy based on a feedback reward includes: weighting each prediction sub-model based on a weight indicated by the action, generating, by the weighted prediction sub-model, wind power prediction; calculating, by the environment, the reward based on a reward function so as to be returned to the agent; and improving, by the agent, the policy continuously based on the reward to form a stable action selection policy.

As an optional implementation, until the DDPG algorithm converges comprises: reasonably assigning, by the agent, a weight of each of the prediction sub-model in a current environment with a goal of maximizing the obtained reward, so as to ensure convergence of the algorithm and achieve theoretical and optimal weight assignment.

A wind power prediction system based on a DDPG algorithm includes:

a data obtaining module configured to obtain data related to wind power prediction;

a prediction sub-model prediction module configured to input the obtained data to each of a plurality of different trained prediction sub-models, to obtain corresponding wind power prediction value of the prediction sub-model;

a combined model building module configured to build a combined model, where the combined model is a combination of various prediction sub-models, and each prediction sub-model is assigned with a respective weight;

a combined model optimization module configured to perceive a current state from a prediction environment at a to-be-predicted time point by using the DDPG algorithm, determine a policy based on the current state, obtain a weight with exploration noise, assign the weight to the combined model, and iteratively optimize the policy based on a feedback reward until the DDPG algorithm converges; and a power prediction module configured to determine a final weight based on the converged current policy, and assign the final weight to the combined model to obtain a final wind power prediction value.

Compared with the prior art, the present disclosure has following beneficial effects.

The present disclosure provides a wind power variable weight combined prediction method to improve accuracy of wind power prediction. Compared with a conventional wind power fixed weight combined prediction method, in the method in the present disclosure, local behaviors of various sub-models as an external prediction environment changes can be fully considered, and weights of combined models can be dynamically adjusted to better integrate advantages of various sub-models. Performance of the sub-models at n historical time points and fluctuation and change rules of meteorological factors can be considered in weight assignment of the sub-models.

The present disclosure introduces the DDPG algorithm to application of the wind power variable weight combined prediction for the first time. The DDPG algorithm integrates a nonlinear fitting advantage of deep learning and a continuous decision-making capability of reinforcement learning. Compared with traditional Q-learning algorithms, the DDPG algorithm can achieve high-dimensional continuous state space and action space, which are suitable for an application scenario of dynamic weight assignment.

In the present disclosure, a reward mechanism is designed for applying a deep deterministic policy algorithm to the wind power variable weight combined prediction. This mechanism first sets a fixed reward based on a ranking of prediction result of the combined model in each sub-model, and secondly sets an additional dynamic reward based on a ratio of a combination prediction error to a prediction error of an optimal sub-model when the combination prediction result is optimal, in order to promote model convergence and ensure optimal weight assignment.

In order to make the above objectives, features, and advantages of the present disclosure more comprehensible, preferred embodiments are described in detail with reference to the accompanying drawings.

BRIEF DESCRIPTION OF THE DRAWINGS

The accompanying drawings which constitute a part of the present disclosure are intended to provide further understanding of the present disclosure. The exemplary embodiments of the present disclosure and description thereof are intended to explain the present disclosure and do not constitute an improper limitation to the present disclosure.

DETAILED DESCRIPTION

The present disclosure is further described below with reference to the accompanying drawings and embodiments.

It should be noted that the following detailed description is exemplary and is intended to provide further description of the present disclosure. Unless otherwise indicated, all technical and scientific terms used herein have the same meaning as those generally understood by those of ordinary skill in the art to which the present disclosure belongs.

It should be noted that the terms used herein are merely intended to describe the specific implementations, but are not intended to limit exemplary implementations of the present disclosure. As used herein, the singular form is also intended to include the plural form unless otherwise explicitly indicated in the context. Furthermore, it should be further understood that the terms "contain", "include" and/or "comprise" used in this specification indicate the presence of features, steps, operations, devices, components and/or a combination thereof.

The embodiments of the present disclosure and the features in the embodiments can be combined with each other in the case of no conflict being caused.

Embodiment 1

Figure 1:
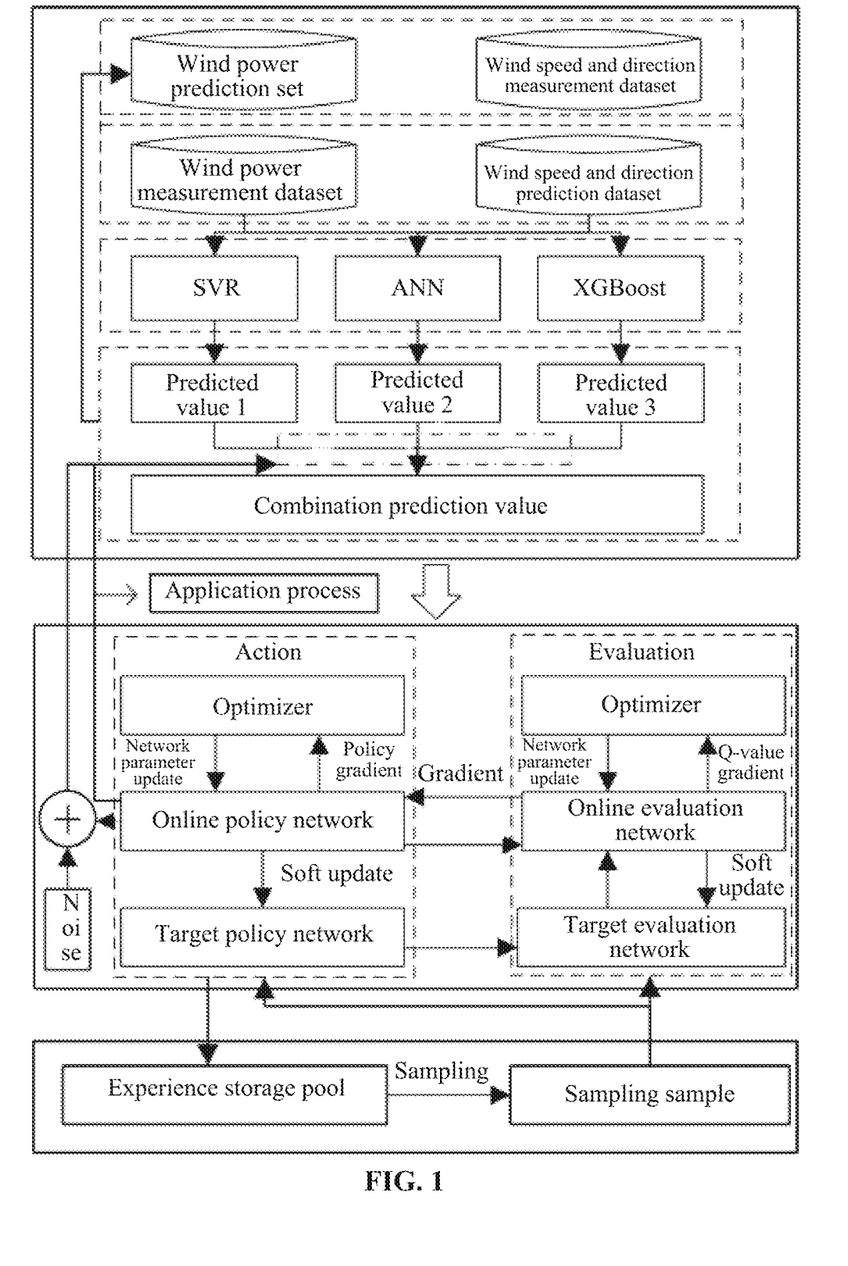
FIG. 1 is a schematic flowchart of a wind power prediction method based on a DDPG algorithm according to an embodiment of the present disclosure.

According to the embodiment of the present disclosure, a variable weight combination-based wind power prediction method based on a deterministic strategy policy algorithm (DDPG) algorithm is provided. As shown in FIG. 1, the method includes the following steps:

(1) obtaining a historical wind power sequence, as well as wind speed and direction prediction data at a to-be-predicted time;

(2) inputting the data to a trained support vector machine regression (SVR) model, artificial neural network (ANN) model, and extreme gradient boost tree (XG-Boost) model to obtain wind power prediction values of various sub-models;

(3) perceiving a current state from prediction environment by the DDPG algorithm in an explorative learning process, outputting a weight action with exploration noise to a combined model based on a current policy, and continuously updating and optimizing updated policy based on a returned reward;

(4) considering the current policy to be optimal after the DDPG algorithm has been converged, perceiving the state from the prediction environment by the algorithm in an application process, and outputting the action weight to the combined model based on the policy to obtain a final wind power prediction value.

This embodiment fully considers advantages and disadvantages of wind power prediction models based on different principles, and considers a local behavior that prediction performance of each sub-model changes with an external environmental change, and builds a variable weight combination-based wind power prediction model. With nonlinear fitting and continuous decision-making capabilities of the DDPG algorithm, the external environmental change can be fully perceived and an optimal decision can be made. A reward mechanism is optimally designed, so as to make the algorithm converge successfully and ensure theoretically optimal weight assignment. The variable weight combination-based wind power prediction method can better integrate advantages of various sub-models, further improve accuracy of the wind power prediction, and provide more reliable information for safe and economic dispatching of a power system.

Specifically, a detailed implementation process of this embodiment is as follows.

First, an input variable of each prediction sub-model is selected. From a perspective of time sequence auto correlation, because a fluctuation of the wind speed has a certain inertia in a short period of time, a wind power sequence also has inertia in a short term, that is, wind powers at multiple historical time points and a wind power at a to-be-predicted time point have a relatively strong auto correlation. From a perspective of cross-correlation, the wind power is closely related to numerical weather prediction (NWP) data, including the wind speed, a wind direction, temperature, relative humidity, and the like.

In order to measure influence degree of various factors on the wind power, a correlation between each influencing factor and the wind power is quantitatively analyzed by using auto correlation and cross-correlation coefficients. A formula for calculating the auto correlation coefficient is shown in (1):

$$\rho_Y(\Delta t) = \frac{E[(Y_t - \mu_Y)(Y_{t-\Delta t} - \mu_Y)]}{\sigma_Y^2}, \quad (1)$$

where $Y_t$ represents wind power data at a time point t, $Y_{t-\Delta t}$ represents wind power data at a time point $t-\Delta t$, represents a mean value of wind power data, and $\sigma_Y^2$, represents a variance of the wind power data.

A formula for calculating the cross-correlation coefficient is shown in (2):

$$\rho(X, Y) = \frac{\sum_{i=1}^{N}(X_i - \mu_X)(Y_i - \mu_Y)}{\sqrt{\sum_{i=1}^{N}(X_i - \mu_X)^2}\sqrt{\sum_{i=1}^{N}(Y_i - \mu_Y)^2}}, \quad (2)$$

where $X_i$ and $Y_i$ respectively represent a meteorological variable and the wind power, $\mu_X$ and $\mu_Y$ respectively represent a mean value and a variance of the wind power, and N represents a number of samples.

Table 1 shows correlation results between multiple factors and the wind power. According to analysis results of the auto correlation coefficients, it can be seen that the auto correlation coefficients of the wind power at time points t-1, t-2 and t-3 are all greater than 0.9, where t represents the current time point. Therefore, the wind power at the time points t-1, t-2 and t-3 are selected as a part of prediction input variables. According to analysis results of the cross-correlation coefficients, it can be seen that in the meteorological variables, a cross-correlation coefficient between the wind speed and the wind power is the highest, and a cross-correlation coefficient between the temperature and the wind power, a cross-correlation coefficient between the humidity and the wind power, and a cross-correlation coefficient between the wind direction and the wind power are relatively low. Considering a close relationship between the wind speed and the wind direction, the wind speed and the wind direction are selected as the prediction input variables herein.

TABLE 1

Wind power auto correlation coefficients and meteorological variable cross-correlation coefficients

| Variable | Cross-correlation coefficient | Variable | Auto correlation coefficient |
| --- | --- | --- | --- |
| Temperature | 0.2557 | Power$_{t-1}$ | 0.9670 |
| Humidity | 0.3453 | Power$_{t-2}$ | 0.9356 |
| Wind speed | 0.7324 | Power$_{t-3}$ | 0.9068 |
| Wind direction | 0.2187 | Power$_{t-4}$ | 0.8818 |

Then, a wind power prediction sub-model is built.

Figure 5:
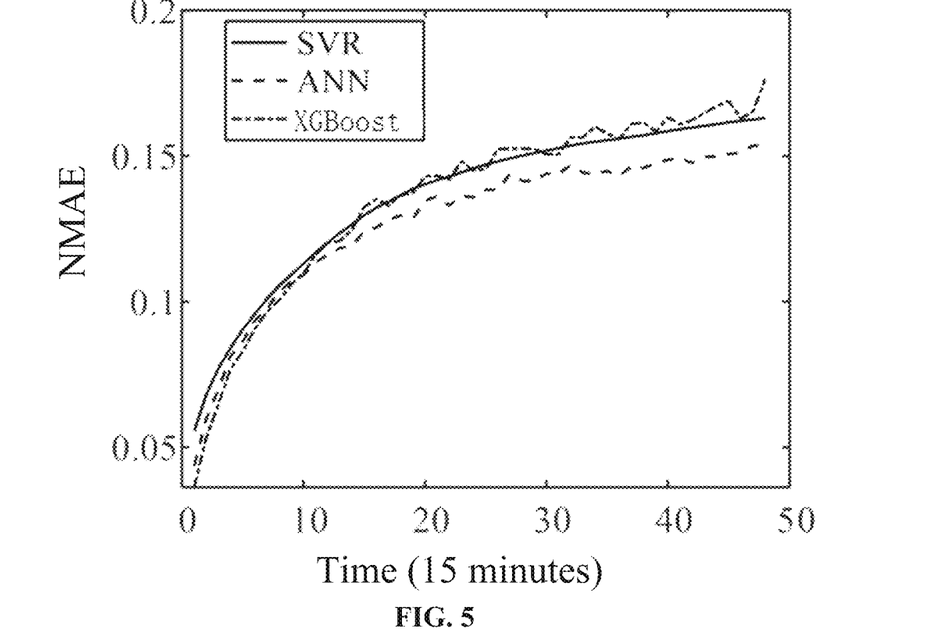
FIG. 5 is a first evaluation diagram of prediction accuracy of various sub-models at different prediction scales as well as "equal-likelihood" and dispersion of various sub-models according to an embodiment of the present disclosure.

Accuracy of a combination prediction result depends on the performance of the sub-models. Selecting the sub-models reasonably is a first step to build an efficient combined model. Quality of sub-model combination is generally evaluated by equal-likelihood and dispersion. The equal-likelihood means that any sub-model should not always be better than another sub-model, otherwise a poor sub-model should be eliminated. The equal-likelihood can be measured by a Talagrand distribution. The more even the distribution is, the better the combination effect is. The dispersion reflects reliability of the sub-model combination, and is usually quantified by standard deviation of the prediction values of the sub-models. A larger standard deviation leads to a larger dispersion degree and a better combination. The present disclosure uses three sub-models of the SVR, ANN, and XGBoost for combination. Prediction accuracies of the three sub-models at different look-ahead time points, and the predicted Talagrand distribution and dispersion of the three sub-models in 12-hour ahead prediction are shown in FIG. 5. It can be seen that for the three sub-models, the prediction accuracies are relatively similar, the Talagrand distributions are relatively average, and the dispersions are in an acceptable range.

A formula for calculating a sum of the Talagrand distributions is shown in (3):

$$F_k = \frac{N_k}{N}, k = 1, \ldots, K+1, \quad (3)$$

where K represents a number of sub-models. Space where the wind power prediction value is located is divided into K+1 intervals by prediction values of K sub-models. Statistical measurement of the distribution of the wind power in each interval is the Talagrand distribution.

A formula for calculating the dispersion is shown in (4):

$$D(t+h) = \sqrt{\frac{1}{NK}\sum_{n=1}^{N}\sum_{k=1}^{K}\left(\hat{f}_n^k(t+h) - \bar{f}_n(t+h)\right)^2}, \quad (4)$$

Where t represents the current time point, h represents an ahead prediction scale, N represents a number of samples, K represents a number of sub-models, $\hat{f}_n^k(t+h)$ represents a prediction value of $k^{th}$ sub-model, and $\bar{f}_n(t+h)$ represents a mean value of wind power prediction values of the K sub-models.

In this embodiment, the three prediction sub-models are trained by the same test set data.

1) Support Vector Machine Regression (SVR)

Support vector machine is a machine learning method proposed by Cortes and Vapnik for small sample data, which can be used to resolve linear and nonlinear classification and regression problems. The SVM has certain advantages in dealing with nonlinear data, and its core part is in that kernel mapping and structural risk are introduced. For a given training sample set $\{(x_i, y_i)\}_{i=1}^N$, the SVR constructs convex quadratic programming to uniquely find a global optimal solution. An objective optimization function is shown in (5), and constraints are shown in (6):

$$\min_{\alpha, \alpha^*} \frac{1}{2} \sum_{i=1}^{N} \sum_{j=1}^{N} (\alpha_i^* - \alpha_i)(\alpha_j^* - \alpha_j) K(x_j, x_i) - \sum_{i=1}^{N} (\alpha_i^* - \alpha_i) y_i + \sum_{i=1}^{N} (\alpha_i^* + \alpha_i) \varepsilon, \quad (5)$$

$$\text{s.t.} \begin{cases} \sum_{i=1}^{N} (\alpha_i^* - \alpha_i) = 0 \\ 0 < \alpha_i, \alpha_i^* < C, i = 1, \ldots, N \end{cases} \quad (6)$$

where $\alpha$ and $\alpha^*$ represent to-be-optimized variables; N represents a number of samples; K(•) represents a kernel function, and a Gaussian kernel function is used in the present disclosure; C represents a penalty factor; and $\varepsilon$ represents fitting precision. In a prediction stage, for a new input variable x, the wind power prediction value may be expressed as (7):

$$f(x) = \sum_{i=1}^{N} (\overline{\alpha}_i^* - \overline{\alpha}_i) K(x, x_i) + b, \quad (7)$$

where $\overline{\alpha}_i^*$ and $\overline{\alpha}_i$ represent optimized variables, N represents a number of samples, K(•) represents the kernel function, $x_i$ represents an output variable sample, and f(x) represents the wind power prediction value.

2) Artificial Neural Network (ANN)

The ANN is based on an idea of neurons. The neurons are connected with a certain weight, and an activation function is used to deal with a problem of nonlinear fitting. An output value of each layer may be expressed as (8):

$$y^k = f^k(W^k y^{k-1} + b^k), \quad (8)$$

where $y^k$ represents an output of a $k^{th}$ layer, $W^k$ represents a weight matrix of the $k^{th}$ layer, $b^k$ represents a bias vector of the $k^{th}$ layer, and $f^k(•)$ represents an activation function of the layer. In a training process, an optimal weight matrix and a bias vector of each layer can be obtained.

3) Extreme gradient Boost tree (XGBoost)

The XGBoost is an improved model based on a gradient boosting decision tree (GBDT). A regular term is added to an objective function to prevent over-fitting, and a Taylor formula is used to expand a loss function to a second order to speed up an iteration. For each tree t, an objective optimization function is shown in (9):

$$\min L^t = \sum_{j=1}^{T} \left[ G_j W_j + \left( \frac{1}{2} H_j + \lambda \right) W_j^2 \right] + \gamma T, \quad (9)$$

where $G_j$ and $H_j$ respectively represent a sum of first-order partial derivatives of all samples on a $j^{th}$ leaf and a sum of second-order partial derivatives of all the samples on the $j^{th}$ leaf, $W_j$ represents a weight of the $j^{th}$ leaf, $\lambda$ and $\gamma$ represent penalty factors of the regular term, and T represents a total number of leaves.

This embodiment adopts the DDPG algorithm to perform a wind power combination prediction.

Figure 2:
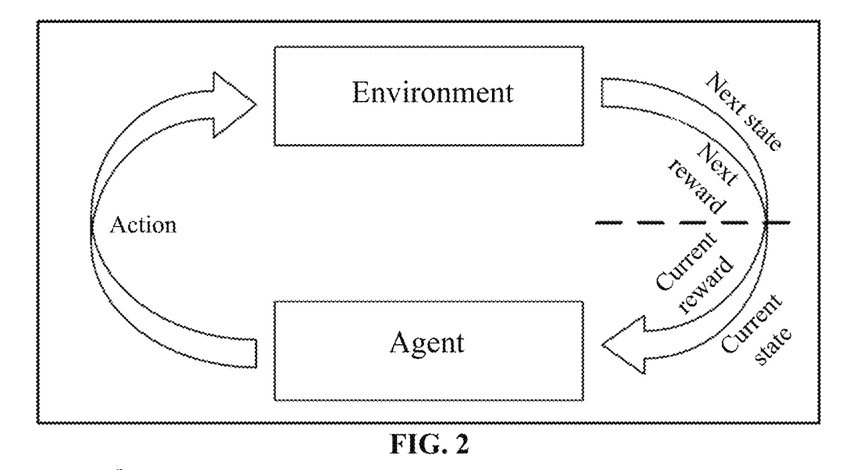
FIG. 2 is a schematic diagram of a basic structure of a deep deterministic policy algorithm according to an embodiment of the present disclosure.

The DDPG algorithm is a kind of deep reinforcement learning. The deep reinforcement learning combines advantages of the deep learning and the reinforcement learning, and can consider a large number of inputs and optimize a specific objective. The deep reinforcement learning includes two main components, namely, an environment and an agent, and includes three basic elements, namely, a state, an action, and a reward. The agent perceives a state of the environment and takes actions to affect the environment. In addition, the environment returns a reward to the agent, and the environment obtains a new environment state through conversion based on a certain state transition probability. The explanatory diagram of the deep reinforcement learning is shown in FIG. 2.

Through a continuous trial-and-error exploration mechanism, the deep reinforcement learning attempts to maximize a discount reward based on a better action policy. The expression of the discount reward is shown in (10):

$$R_t = \sum_{i=t}^{T} \gamma^{i-t} r_i, \quad (10)$$

where $\gamma$ is a discount factor, whose value range is [0,1]. The discount factor reflects emphasis degrees on future rewards, and $r_i$ represents a reward function.

$s_t$ and $\alpha_t$ are defined as a state and an action at the time point t respectively, $\mu$ is defined as a policy reflecting a mapping relationship from the state to the action, and $Q(s_t, \alpha_t)$ is defined as an action value function, which is used to quantitatively evaluate superiority of the current policy. The larger the value is, the better the policy is. According to a Behrmann equation, there is a recursive relationship, as shown in (11):

$$Q(s_t, \alpha_t) = E[r_t + \gamma Q(s_{t+1}, \mu(s_{t+1}))]. \quad (11)$$

A traditional reinforcement learning algorithm, for example, a Q learning algorithm, usually adopts an iterative optimization policy in a form of a state-action two-dimensional table. However, actual filling may be high-dimensional continuous, and a tabular solution method is greatly limited. Therefore, the deep reinforcement learning introduces deep learning algorithm fitting $Q(s_t, \alpha_t)$, such that the agent can solve a problem of a high-dimensional continuous state.

The DDPG algorithm is a kind of deep reinforcement learning, which adopts policy iteration to enable the agent to output continuous state space. In this algorithm, the policy is regarded as a parameter of the value function, and is continuously optimized by a gradient ascent method. The DDPG algorithm adopts an Actor-Critic framework, where the Actor represents a deterministic policy $\mu(s)$, the Critic represents the action value function $Q(s, \alpha)$, and both the Actor and the Critic are fitted by using a deep learning network, and their network parameters are $\theta$ and $\omega$. These two networks are referred to as online networks. In addition, two other deep learning networks are established, and their network parameters are respectively $\theta'$ and $\omega'$, which are obtained according to formulas (11) and (12):

$$\theta' \leftarrow \tau\theta + (1-\tau)\dot{\theta}, \quad (11)$$

$$\omega' \leftarrow \tau\omega + (1-\tau)\dot{\omega}, \quad (12)$$

where $\tau$ is referred to as a soft update coefficient.

The DDPG algorithm introduces a memory buffer pool to break a correlation between sample data, and adds noise to an output action in a learning process to improve learning capability of the model. In the learning process, based on N samples $(s_j, \alpha_j, r_j, s_{j+1})$, j=1, . . . ,N randomly selected from an experience pool, an online evaluation network is first updated, and its loss function is shown in (13):

$$L = \frac{1}{N}\sum_{j=1}^{N}[y_j - Q(s_j, a_j | \omega)]^2, \tag{13}$$

where $$y_j = r_j + \gamma Q'(s_{j+1}, \mu'(s_{j+1} | \theta') | \omega'), \tag{14}$$

then, the parameter ω of the online evaluation network is updated as shown in (15):

$$\omega \leftarrow \omega - \alpha_\omega \nabla_\omega L, \tag{15}$$

where $\alpha_\omega$ is a learning rate of the evaluation network, and $\nabla_\omega L$ is a gradient of the loss function with respect to the network parameter ω.

Next, the online policy network is updated according to a chain rule shown in the formula (11), and its loss gradient with respect to the network parameter θ is expressed in a formula (16):

$$\nabla_\theta \approx E(\nabla_\theta Q(s, \alpha | \omega)|_{s=s_j, \alpha=\mu(s_j|\theta)}) = E(\nabla_\alpha Q(s, \alpha | \omega)_{s=s_j, \alpha=\mu(s_j)} \nabla_\theta \mu(s|\theta)|_{s=s_j}). \tag{16}$$

The above formula is proved to be a policy gradient, and then θ can be updated as shown in (17):

$$\theta \leftarrow \theta + \alpha_\theta \nabla_\theta J, \tag{17}$$

where $\alpha_\theta$ represents a learning rate of the policy network.

An external environment is defined as a combination mechanism of various sub-models in an external prediction environment, and a function of the agent is defined to perceive a state from the external environment, output weights of the sub-models to the environment, and obtain corresponding rewards from the environment. A h-step ahead wind power prediction is taken as an example, the state perceived by the agent from the environment includes historical NWP data, NWP data at the to-be-predicted time point, a historical wind power prediction result of the sub-model, a prediction result of the sub-model at the to-be-predicted time point, a historical meteorological measurement value, a historical wind power measurement value, and the like. Therefore, the environment state is defined as shown in (18):

$$S = \{\hat{S}_1, S_1, S_2\}, \tag{18}$$

where $\hat{S}_1$ and $S_1$ respectively represent predicted and measured meteorological variables, and $S_2$ represents a latest performance indicator of the sub-model based on the historical wind power prediction values and measurement values.

$\hat{v}_s$, $v^s$, $\hat{v}_d$, $v^d$ are respectively defined as a predicted wind speed, a measured wind speed, a predicted wind direction, and a measured wind direction. Therefore, $\hat{S}_1$ in the formula (18) can be expressed as a formula (19), and $S_1$ can be expressed as a formula (20):

$$\hat{S}_1 = \{\text{avg}(\hat{v}_{t-n}^s, \ldots, \hat{v}_t^s), \text{var}(\hat{v}_{t-n}^s, \ldots, \hat{v}_t^s), \hat{v}_{t+h}^s, \text{avg}(\hat{v}_{t-n}^d, \ldots, \hat{v}_t^d), \text{var}(\hat{v}_{t-n}^d, \ldots, \hat{v}_t^d), \hat{v}_{t+h}^d\} \tag{19}$$

$$S_1 = \{\text{avg}(v_{t-n}^s, \ldots, v_t^s), \text{var}(v_{t-n}^s, \ldots, v_t^s), \text{avg}(v_{t-n}^d, \ldots, v_t^d), \text{var}(v_{t-n}^d, \ldots, v_t^d)\} \tag{20}$$

where avg(•) and var(•) respectively represent operations of calculating the mean value and calculating the variance. The mean value and the variance instead of an original measured or predicted value are used herein to extract as much valuable information as possible, while reduce dimensions of a state quantity, and reduce redundancy.

For $S_2$, latest performance of the sub-model can be measured by an optimal weight of each sub-model at the latest m+1 time points. $\hat{f}$ and f are defined to respectively represent the wind power prediction value and the wind power measurement value. Then, an optimization weight of each sub-model at the first m+1 time points can be obtained based on an optimization problem constructed according to a formula (21). The objective function here is to maximize a cosine value of an included angle between a vector of a wind power combination prediction value and a vector of a wind power measurement value.

$$\max_w \frac{\sum_{i=0}^{m}\left[\left(\sum_{j=1}^{k} w_{t-i}^j \hat{f}_{t-i}^j\right) \cdot f_{t-i}\right]}{\sqrt{\sum_{i=0}^{m}\left(\sum_{j=1}^{k} w_{t-i}^j \hat{f}_{t-i}^j\right)^2} \cdot \sqrt{\sum_{i=0}^{m} f_{t-i}^2}} \tag{21}$$

$$s.t. \begin{cases} \sum_{j=1}^{k} w_{t-i}^j = 1, i = 0, \ldots, m \\ 0 \leq w_{t-i}^j \leq 1, i = 0, \ldots, m, j = 1, \ldots, k \end{cases}$$

where $\hat{f}_{t-i}^j$ represents a wind power prediction value of a $j^{th}$ sub-model at a time point t−i, and $f_{t-i}$ represents a wind power measurement value at the time point t−i. Element of a matrix $w \in \mathbb{R}^{(m+1)\times k}$ are $w_{t-i}^j$, representing to-be-optimized weights.

Based on an obtained historical optimal weight, an expression of $S_2$ is shown in (22):

$$S_2 = \{\text{avg}(\overline{w}_{t-m}^1, \ldots, \overline{w}_t^1), \ldots, \text{avg}(\overline{w}_{t-m}^k, \ldots, \overline{w}_t^k), \hat{f}_{t+h}^1, \ldots, \hat{f}_{t+h}^k, \text{var}(\overline{w}_{t-m}^1, \ldots, \overline{w}_t^1), \ldots, \text{var}(\overline{w}_{t-m}^k, \ldots, \overline{w}_t^k)\}, \tag{22}$$

where $\overline{w}_{t-m}^k$ represents an optimal weight of the $k^{th}$ sub-model at a time point t−m, and $\hat{f}_{t+h}^k$ represents a wind power prediction value of the $k^{th}$ sub-model at the to-be-predicted time point.

At the time point t, an action of the agent is to assign a weight of a wind power prediction value of the sub-model at a time point t+h. The action can be expressed as a formula (23):

$$A\{w_{t+h}^1, \ldots, w_{t+h}^k\}, \tag{23}$$

The setting of reward mechanism is very important for the DDPG model, and will affect convergence and stability of the model. In the present disclosure, a size of the reward reflects quality of weight setting of the combined model. First, ranking is performed based on prediction absolute errors of the combined model and various sub-models. The smaller the ranking value is, the better the prediction performance is. The ranking of 1 indicates the best prediction. Then, a reward function is designed based on a prediction performance ranking of the combined model, as shown in formulas (24) to (26):

$$r = r_1 + r_2, \tag{24}$$

Figure 3:
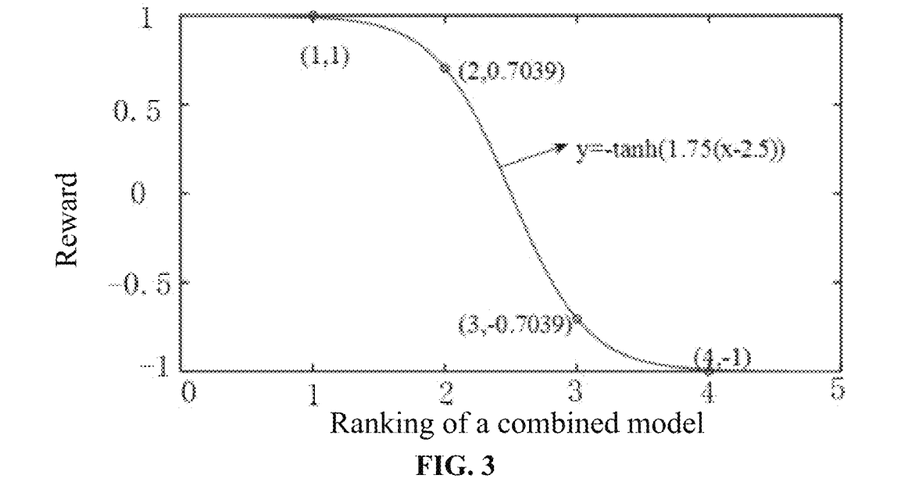
FIG. 3 is a schematic diagram of a first part of a reward according to an embodiment of the present disclosure.

-continued $$r_1 = \begin{cases} 1 & \text{if } \Lambda = 1 \\ -\tanh\left[m\left(\Lambda - \frac{k+1}{2}\right)\right] & \text{if } \Lambda = 2, \ldots, k, \\ -1 & \text{if } \Lambda = k+1 \end{cases} \quad (25)$$

$$r_2 = \begin{cases} 1 - \hat{e}/\min\{e^1, \ldots, e^k\} & \text{if } \Lambda = 1 \\ 0 & \text{if } \Lambda \neq 1 \end{cases}, \quad (26)$$

where r represents a total reward, $r_1$ represents a partial reward, which is related to the performance ranking of the combined prediction model, $r_2$ represents another partial reward, which is related to a ratio of the prediction absolute error of the combined prediction model to prediction absolute error of an optimal sub-model, $\Lambda$ represents the ranking of the combined prediction model, k represents the number of sub-models, m is a constant, ê represents an absolute error of a combined prediction value, and $e^k$ represents prediction absolute error of the $k^{th}$ sub-model. A variant of a hyperbolic tangent function is used to map a relationship between the prediction performance ranking of the combined model and the reward. m is used to control a speed of reward decline when the ranking declines. In the present disclosure, three sub-models are adopted, m is set to 1.75, and a setting of $r_1$ is shown in FIG. 3. It can be seen that if the combined model performs best, the agent gets a highest reward, and if the combined model ranks high, the agent also gets a certain reward. On the contrary, if the combined model performs worst, the agent gets a lowest reward, and if the combined model ranks lower, the agent also gets a lower reward. The reward $r_1$ is set to ensure that the combined model has better performance than that of the sub-model.

Figure 4:
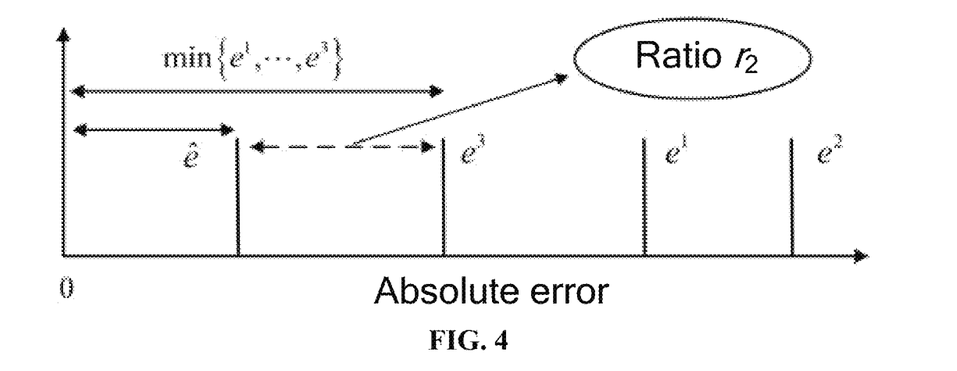
FIG. 4 is a schematic diagram of a second part of a reward according to an embodiment of the present disclosure.

As a supplement to the reward $r_1$, the reward $r_2$ encourages the agent to further improve a weight assignment policy when the combined model ranks first. The reward mechanism is shown in FIG. 4. When a combined prediction ranks first, its absolute error is the smallest. Therefore, both ê/min{$e^1$, . . . ,$e^k$} and corresponding $r_2$ are both within a range of [0,1]. In addition, the larger $r_2$ is, the better the performance of the combined prediction is.

The reward setting method of the present disclosure is designed based on the ranking of the combined model, rather than directly using some accuracy indicators, in which dominance of the sub-models over the combined model is considered. Sometimes, all of the sub-models do not predict well, so the combined model may not get accurate prediction results. However, if the combined model is much better than all the sub-models, the agent can still get a higher reward. This reward setting method has positive significance for improving convergence of the model.

In this embodiment, normalized mean absolute error (NMAE) and a normalized root mean square error (NRMSE) are used to evaluate performance of this method. Expressions of NMAE and NRMSE are shown in formulas (27) and (28) respectively:

$$NMAE = \frac{1}{N}\sum_{i=1}^{N}\left|\frac{(y_i - \hat{y}_i)}{C}\right|, \quad (27)$$

$$NRMSE = \frac{1}{N}\sqrt{\sum_{i=1}^{N}\left(\frac{y_i - \hat{y}_i}{C}\right)^2}, \quad (28)$$

where N is the number of samples, $y_i$ and $\hat{y}_i$ are respectively the wind power measurement value and the wind power prediction value, and C is an installed capacity of a wind power plant.

In the embodiment, a 100 MW wind power plant in a province is used as an example to verify effectiveness of the method. Wind power data is provided by a supervisory control and data acquisition (SCADA) system, wind speed observation data and wind direction observation data are provided by an anemometer tower of the wind power plant, and NWP data is provided by China Meteorological Administration. Time span of a dataset is from Jan. 1, 2016 to Dec. 31, 2017, with a time resolution is 15 minutes. The whole dataset is divided into two subsets. The SVR, ANN and XGBoost sub-models are trained by using data from Jan. 1, 2016 to Dec. 31, 2016, and remaining data is used for a DDPG-AWCM learning process to verify effectiveness of the DDPG-AWCM learning process in improving wind power prediction data.

Figure 6:
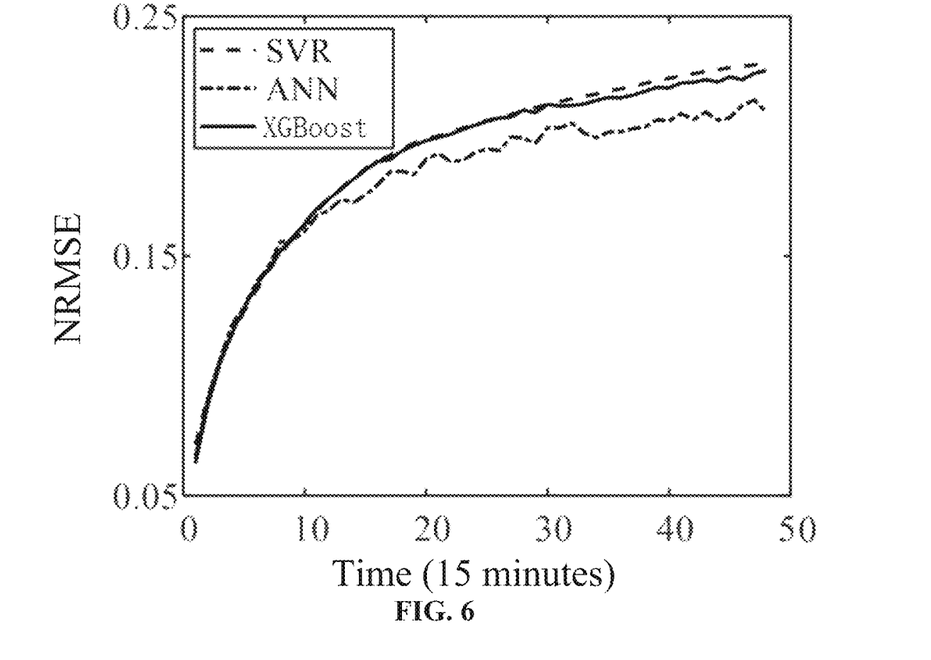
FIG. 6 is a second evaluation diagram of prediction accuracy of various sub-models at different prediction scales as well as "equal-likelihood" and a dispersion of various sub-model according to an embodiment of the present disclosure.

In FIG. 5 and FIG. 6, NMAE and NRMSE are used to evaluate accuracy of the sub-models respectively. Results show that prediction accuracy of each sub-model decreases with the increase of prediction time. In addition, the XGBoost sub-model performs better at a short prediction scale. With the increase of the prediction time, advantages of ANN gradually become prominent. In general, great difference is not shown in accuracy of the sub-models in different prediction scales.

Figure 7:
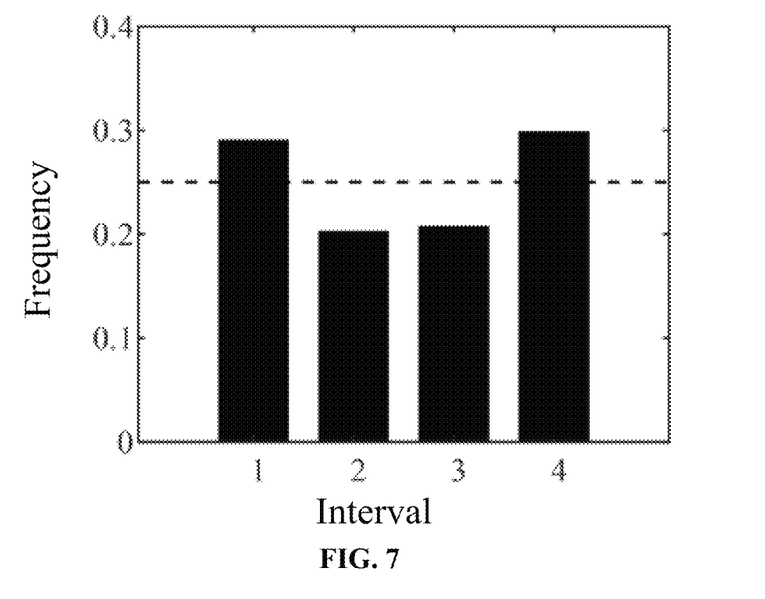
FIG. 7 is a third evaluation diagram of prediction accuracy of various sub-models at different prediction scales as well as "equal-likelihood" and a dispersion of various sub-models according to an embodiment of the present disclosure.
Figure 8:
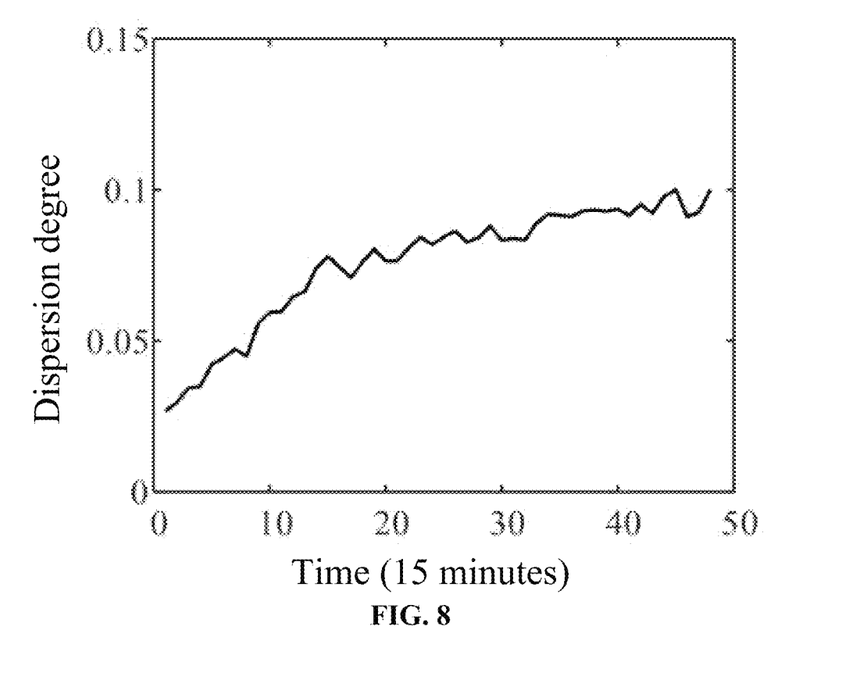
FIG. 8 is a fourth evaluation diagram of prediction accuracy of various sub-models at different prediction scales as well as "equal-likelihood" and a dispersion of various sub-models according to an embodiment of the present disclosure.
Figure 9A:
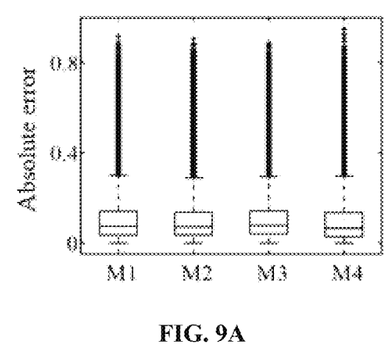
FIGS. 9A-9D are bin plots showing absolute errors of different combined models at different prediction scales according to an embodiment of the present disclosure.
Figure 9B:
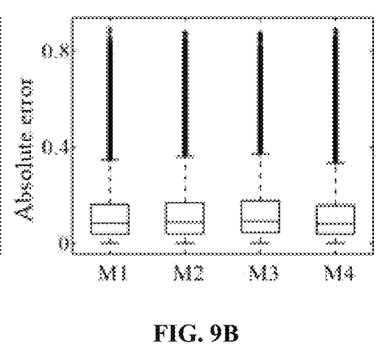
Figure 9C:
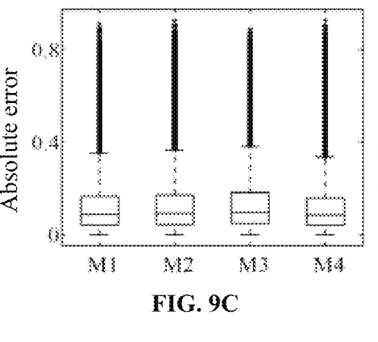
Figure 9D:
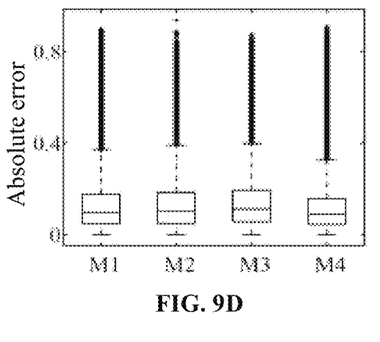

In FIG. 7 and FIG. 8, a Talagrand distribution histogram and the dispersion are used to evaluate combination effect of the sub-models respectively. It can be seen from FIG. 7 that the predicated Talagrand distribution histogram at a future $12^{th}$ hour is about 0.25. It can be seen from FIG. 8 that dispersions of predictions by the sub-model combination at different scales are low, but within an acceptable range. In fact, the low dispersion is a common problem faced by the combination prediction. The present disclosure reduces an impact of this problem on the combined model by introducing adaptive weights.

In order to verify the effectiveness of the method provided in the present disclosure, three comparison models are selected. M1 represents a sliding variable weight method. In this method, a sub-model weight assignment method at the to-be-predicted time point includes: first calculating NMAE of each sub-model at three historical time points, and ranking the sub-models separately: an optimal sub-model, a sub optimal sub-model, and a worst sub-model, and their corresponding errors area minimum NMAE, a second minimum NMAE, and a maximum NMAE respectively. A weight of the optimal sub-model at the to-be-predicted time point is a ratio of the maximum NMAE to a sum of NMAEs of the three sub-models, and weights of the rest sub-models may be deduced by analogy. M2 represents a fixed weight combination method, which uses a particle swarm optimization algorithm to optimize the weights of the sub-models on a training set with a goal of minimizing the NRMSE of the combined prediction. M3 represents an arithmetic average combination method. M4 represents the combination method in the present disclosure.

Table 2 shows prediction accuracy of the combined model in the present disclosure and the comparison models at different prediction scales, and items in bold indicate optimal combined model at the prediction scale for a current evaluation index. For the prediction evaluation index NMAE, with the increase of the prediction scale, NMAE of each combined prediction increases continuously. At the same prediction scale, the combined models provided in the present disclosure all have the lowest NMAE. Similarly, with the increase of the prediction scale, NRMSE of each combined prediction model basically shows an increasing trend. A tall prediction scales shown, the methods provided in the present disclosure have a lowest NRMSE at prediction scales other than 4-hour, 9-hour, and 11-hour prediction scales. With a 12-hour prediction scale as an example, NRMSE and the NMAE of the combined model in the present disclosure are 16.86% and 12.16% respectively, which are respectively reduced by 3.66% and 7.74% compared to those of the best-performing M1 model in the comparison models.

FIGS. 9A-9D show bin plots showing absolute errors of the comparison models and the model in the present disclosure in 3-hour, 6-hour, 9-hour, and 12-hour prediction scales to show a distribution of the absolute errors. A transverse line in the middle of each bin represents a median, upper and lower boundaries represent a 25th percentile and a 75th percentile respectively, which are represented by Q1 and Q3 respectively, and a trail represents an error beyond Q3+1.5* (Q3−Q1). It can be seen that the combined model provided in the present disclosure has the lowest median and the narrowest bin in all prediction scales shown. With the increase of the prediction scale, advantages of the combined model provided in the present disclosure are more obvious.

TABLE 2

Comparison of prediction errors of various models at different time scales

| Prediction scale | NMAE (%) | | | | NRMSE(%) | | | |
| --- | --- | --- | --- | --- | --- | --- | --- | --- |
| | M1 | M2 | M3 | M4 | M1 | M2 | M3 | M4 |
| 1 | 7.98 | 8.12 | 7.97 | 7.33 | 11.53 | 12.08 | 11.93 | 11.26 |
| 2 | 10.21 | 10.29 | 10.13 | 9.36 | 14.72 | 15.46 | 15.35 | 14.37 |
| 3 | 10.98 | 11.27 | 11.26 | 9.98 | 14.99 | 16.21 | 16.5 | 14.56 |
| 4 | 11.21 | 11.81 | 12.05 | 10.85 | 15.36 | 16.82 | 17.42 | 15.88 |
| 5 | 12.27 | 12.80 | 12.93 | 11.49 | 16.61 | 17.99 | 18.51 | 16.57 |
| 6 | 12.11 | 12.65 | 13.00 | 12.07 | 16.35 | 17.83 | 18.67 | 16.32 |
| 7 | 12.66 | 13.25 | 13.52 | 11.8 | 17.00 | 18.56 | 19.29 | 16.85 |
| 8 | 13.42 | 14.05 | 14.07 | 12.46 | 18.02 | 19.56 | 19.95 | 17.59 |
| 9 | 12.41 | 13.22 | 13.58 | 12.25 | 16.67 | 18.47 | 19.42 | 17.38 |
| 10 | 13.11 | 13.96 | 14.12 | 12.38 | 17.33 | 19.19 | 19.89 | 17.30 |
| 11 | 12.92 | 13.89 | 14.10 | 12.48 | 17.17 | 19.05 | 19.8 | 17.57 |
| 12 | 13.18 | 14.18 | 14.45 | 12.16 | 17.50 | 19.45 | 20.17 | 16.86 |

Figure 10:
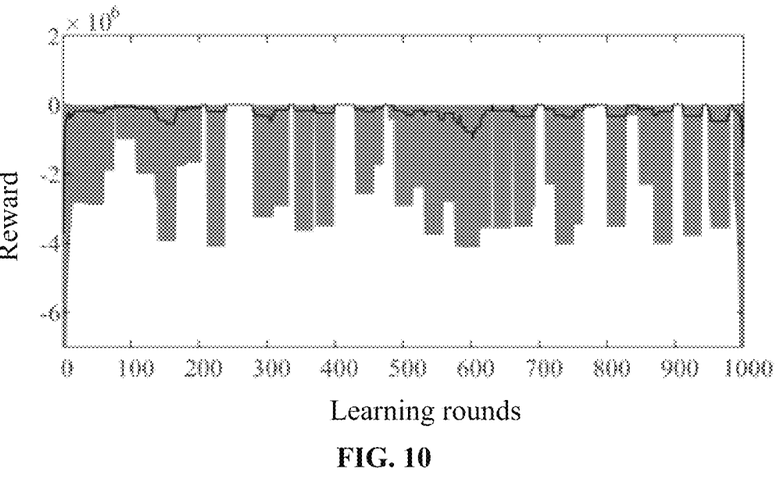
FIG. 10 is a first reward curve graph of different reward setting methods base on a deep deterministic policy algorithm according to an embodiment of the present disclosure.
Figure 11:
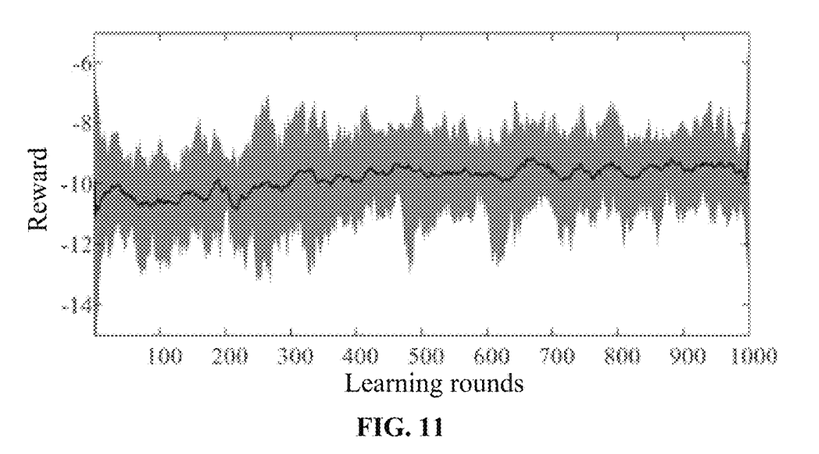
FIG. 11 is a second reward curve graph of different reward setting methods base on a deep deterministic policy algorithm according to an embodiment of the present disclosure.
Figure 12:
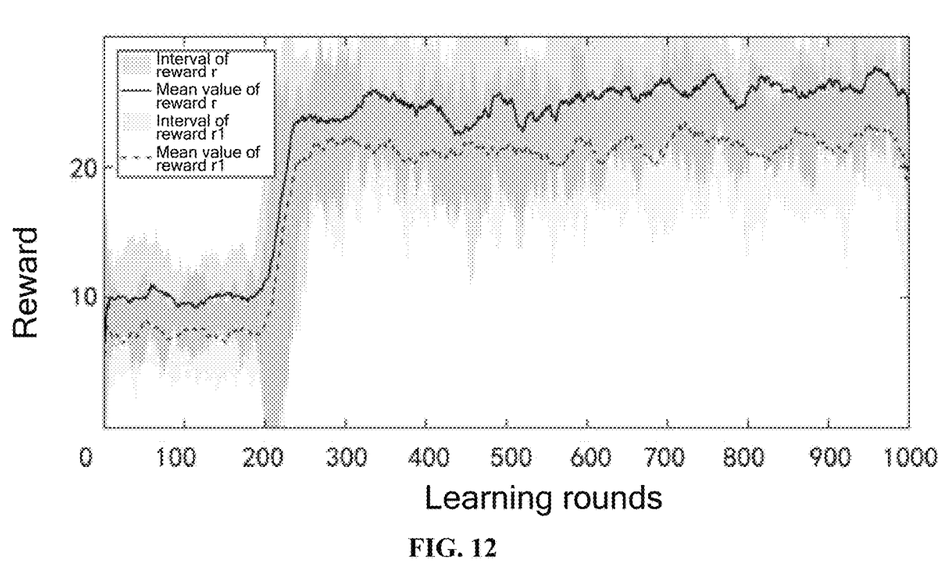
FIG. 12 is a third reward curve graph of different reward setting methods base on a deep deterministic policy algorithm according to an embodiment of the present disclosure.

FIG. 10, FIG. 11, and FIG. 12 show changes in total rewards as a number of learning rounds increases, where a curve represents an average value of 20 repeated tests, and a colored band represents a distribution range of total rewards for 20 repeated tests. The rewards in FIG. 10 and FIG. 11 are $r_2$ and negative numbers of the prediction absolute errors of the combined model respectively. It can be seen that the reward curves do not converge. The reward setting in FIG. 12 is based on the prediction performance ranking of the combined model. r is more than $r_1$ by $r_2$, such that the agent gets more rewards based on ranking first and optimize the weights better. As can be seen from FIG. 12, in the first 200 rounds or so, an experience storage pool is in a sample filling stage, so the reward is very low. Once the experience storage pool is full of samples, the agent starts the learning process. Parameters of Actor and Critic networks begin to be updated, and the reward quickly rises to about 25. From around a $250^{th}$ round, the reward starts to fluctuate between 20 and 30. The whole process shows that the model converges rapidly and successfully.

Figure 13:
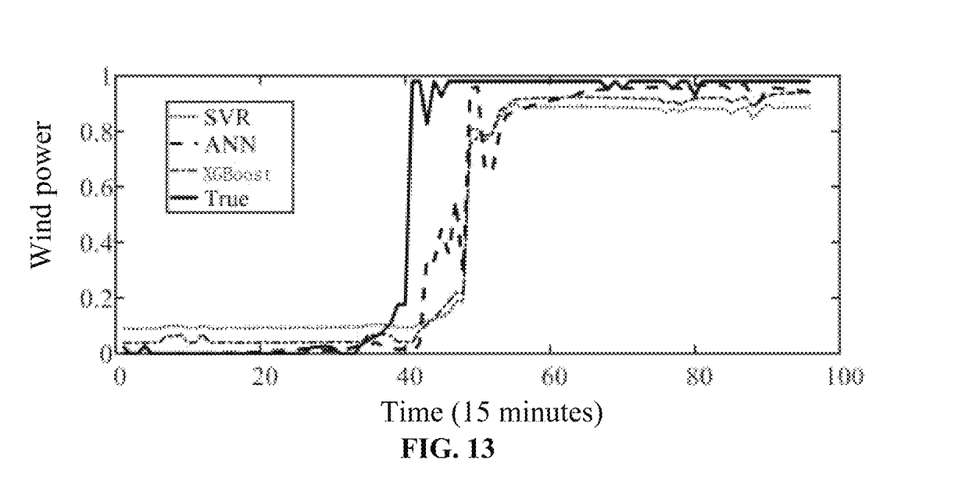
FIG. 13 is a first comparison diagram of prediction curves of a sub-model and various combined models in a 12-hour ahead prediction with a 15-minute interval and comparing weight changes of different variable weight combination methods according to an embodiment of the present disclosure.
Figure 14:
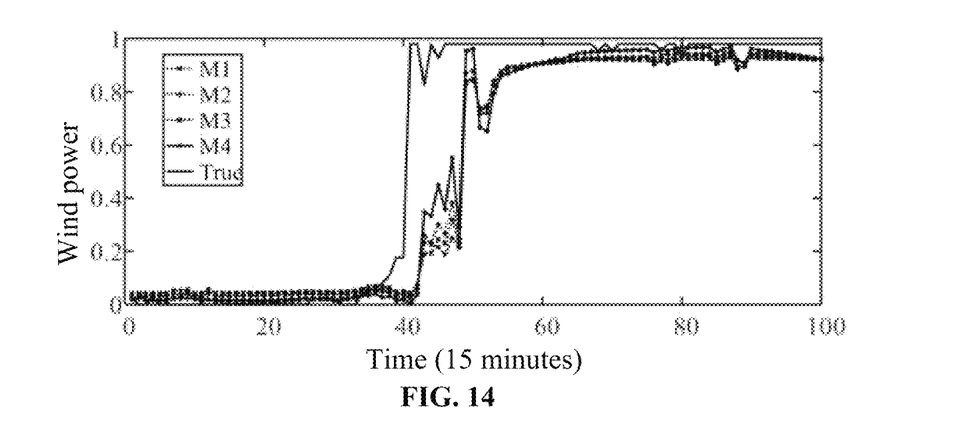
FIG. 14 is a second comparison diagram of prediction curves of a sub-model and various combined models in a 12-hour ahead prediction with a 15-minute interval and comparing weight changes of different weight combination methods according to an embodiment of the present disclosure.
Figure 15:
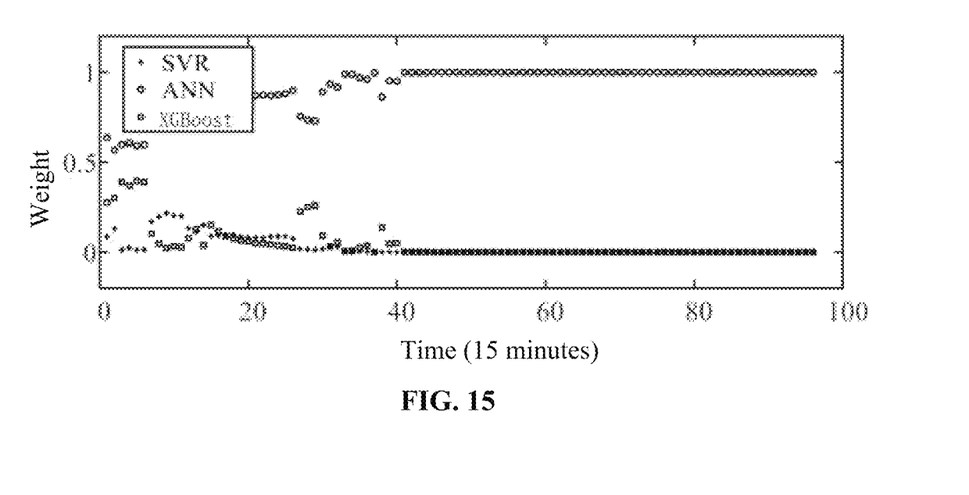
FIG. 15 is a third comparison diagram of prediction curves of a sub-model and various combined models in a 12-hour ahead prediction with a 15-minute interval and comparing weight changes of different weight combination methods according to an embodiment of the present disclosure.
Figure 16:
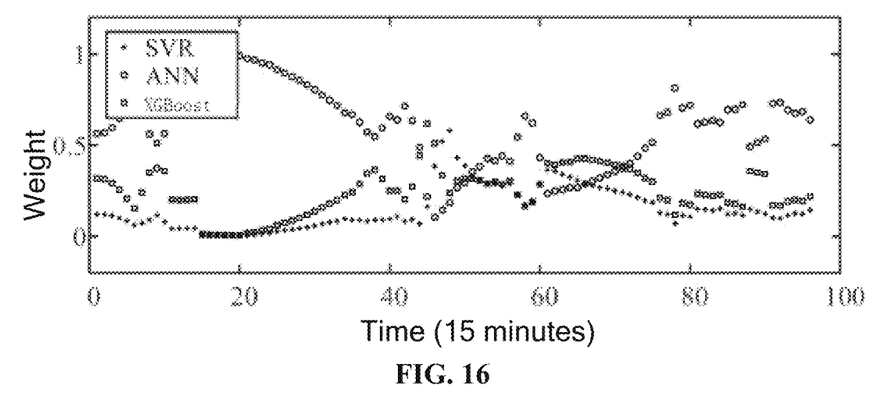
FIG. 16 is a fourth comparison diagram of prediction curves of a sub-model and various combined models in a 12-hour ahead prediction with a 15-minute interval and comparing weight changes of different variable weight combination methods according to an embodiment of the present disclosure.

FIG. 13, FIG. 14, FIG. 15, and FIG. 16 compare the prediction performance of various sub-models and the combined model. Curves are continuous 12-hour wind power prediction curves every 15 minutes. FIG. 13 compares predicted wind power curves and real wind power curves of various sub-models, FIG. 14 compares wind power prediction results of various combination methods, FIG. 15 shows weight assignment of the combination method in the present disclosure in this period, and FIG. 16 shows weight assignment of the combined model M1 in this period. Fixed weights set by the combined model M2 are 0.2648 for the SVR sub-model, 0.555 for the ANN sub-model, and 0.1802 for the XGBoost sub-model, and weights of various sub-models of the combined model M3 are ⅓. The real wind power curve shows that wind gusts occurred in this period, and the wind power increased. It can be seen that when the wind power increases significantly, predicted values of various sub-models cannot track the real wind power in time, and the real wind power is greater than the predicted power of all sub-models. In this period, the ANN sub-model performs best, so in theory, a weight of the ANN sub-model in the optimal combined model should be set to 1. It can be seen from FIG. 15 that the method in the present disclosure can perceive environmental changes in time and assign more weights to the ANN sub-model in this period. The fixed weight models M2 and M3 cannot perceive environmental changes and change the weights in time, and perform worst. M1 can only realize self-adaptive weights from a timing change law of the weight, and performs better, but is still not as good as that of the method in the present disclosure. In the present disclosure, meteorological fluctuations and the timing change law of the weight can be comprehensively considered, and weight adaptation can be better and more comprehensively realized.

Embodiment 2

A wind power prediction system based on a DDPG algorithm includes:
  a data obtaining module configured to obtain data related to wind power prediction;
  a prediction sub-model prediction module configured to input the acquired data into a plurality of different trained prediction sub-models respectively, so as to obtain wind power prediction values of the corresponding prediction sub-models;
  a combined model building module configured to build a combined model, where the combined model is a combination of various prediction sub-models, and each prediction sub-model is assigned with a respective weight;
  a combined model optimization module configured to perceive a current state from a prediction environment at a to-be-predicted time point by using the DDPG algorithm, determine a policy based on the current state, obtain a weight with exploration noise, assign the weight to the combined model, and iteratively optimize the policy based on a feedback reward until the DDPG algorithm converges; and
  a power prediction module configured to determine a final weight value based on the current policy after the convergence, and assign the final weight value to the combined model to obtain a final wind power prediction value.

A detailed working method of the system is the same as the wind power prediction method based on a DDPG algorithm in Embodiment 1, and will not be described here again.

Although the specific implementations of the present disclosure are described with reference to the accompanying drawings, they do not limit the protection scope of the present disclosure. Those skilled in the art should understand that various modifications or variations made by those skilled in the art based on the technical solutions of the present disclosure without creative efforts still fall within the protection scope of the present disclosure.

What is claimed is:

1. A wind power prediction method based on a deep deterministic policy gradient (DDPG) algorithm, comprising:
obtaining data related to a wind power prediction;
inputting the obtained data to each of a plurality of different trained prediction sub-models, to obtain corresponding wind power prediction value of each prediction sub-model;
building a combined model, wherein the combined model is a combination of the plurality of prediction sub-models, and each prediction sub-model is assigned with a respective weight;
perceiving a current state from a prediction environment at a to-be-predicted time point by using the DDPG algorithm, determining a policy based on the current state, obtaining a weight with exploration noise, assigning the weight to the combined model, and iteratively optimizing the policy based on a feedback reward until the DDPG algorithm converges, wherein the DDPG algorithm comprises three basic elements: a state, an action, and a reward, the state is an indicator reflecting external environment information, comprising fluctuation information of meteorological prediction and prediction performance information of the prediction sub-models at a plurality of latest time points; the action is a determined weight and the reward comprises a fixed reward given based on a ranking, and an additional reward set based on a ratio of an absolute prediction error of the combined model to an absolute prediction error of an optimal prediction sub-model when the combined model ranks first; and
determining a final weight based on the converged current policy, and assigning the final weight to the combined model to obtain a final wind power prediction value.

2. The method according to claim 1, wherein the data related to the wind power prediction comprises a historical wind power sequence, as well as wind speed prediction data and wind direction prediction data at the to-be-predicted time point.

3. The method according to claim 1, wherein each prediction sub-model is comprehensively selected based on its Talagrand distribution and dispersion, and when a prediction model has a larger dispersion and a more average Talagrand distribution which means a larger standard deviation of a predicted value, the prediction model is more suitable as the prediction sub-model.

4. The method according to claim 1, wherein the prediction sub-model comprises a support vector regression (SVR) model, an artificial neural network (ANN) model, and an extreme gradient boosting tree (XGBoost) model.

5. The method according to claim 1, wherein the DDPG algorithm comprises two components: an environment and an agent; the environment is a combination mechanism of various prediction sub-models in an external prediction environment; and the agent is configured to perceive a state from an external environment, determine and output a weight of each prediction sub-model to the environment, and obtain a corresponding reward from the environment.

6. The method according to claim 1, wherein the iteratively optimizing the policy based on a feedback reward comprises: weighting each prediction sub-model based on a weight indicated by the action, generating, by the weighted prediction sub-model, wind power prediction; calculating, by the environment, the reward based on a reward function, so as to be returned to the agent; and improving, by the agent, the policy continuously based on the reward to form a stable action selection policy.

7. The method according to claim 6, wherein the until the DDPG algorithm converges comprises: reasonably assigning, by the agent, a weight of each prediction sub-model in a current environment with a goal of maximizing the obtained reward, so as to ensure convergence of the algorithm and achieve theoretically optimal weight assignment.

* * * * *